US011834338B1

(12) United States Patent
Black et al.

(10) Patent No.: US 11,834,338 B1
(45) Date of Patent: Dec. 5, 2023

(54) CONTINUOUS CARBONACEOUS MATTER THERMOLYSIS AND PRESSURIZED CHAR ACTIVATION WITH HYDROGEN PRODUCTION

(71) Applicants: John W. Black, Markham (CA); Russel M. Adams, Penryn, CA (US)

(72) Inventors: John W. Black, Markham (CA); Russel M. Adams, Penryn, CA (US)

( * ) Notice: Subject to any disclaimer, the term of this patent is extended or adjusted under 35 U.S.C. 154(b) by 0 days.

(21) Appl. No.: 17/664,753

(22) Filed: May 24, 2022

(51) Int. Cl.
*C01B 32/39* (2017.01)
*C01B 32/378* (2017.01)

(52) U.S. Cl.
CPC ............ *C01B 32/39* (2017.08); *C01B 32/378* (2017.08); *C01B 2210/0014* (2013.01); *C01B 2210/0051* (2013.01)

(58) Field of Classification Search
CPC ...... C01B 32/378; C01B 32/336; C01B 32/39
See application file for complete search history.

(56) References Cited

U.S. PATENT DOCUMENTS

| | | | |
|---|---|---|---|
| 5,096,463 A | 3/1992 | Beierle | |
| 5,173,921 A | 12/1992 | Gaylord | |
| 5,955,039 A | 9/1999 | Dowdy | |
| 6,061,384 A | 5/2000 | Koslow | |
| 7,771,668 B2 | 8/2010 | Ohashi | |
| 7,981,835 B2 | 7/2011 | Srinivasachar | |
| 8,192,647 B2 * | 6/2012 | Chornet | C10J 3/463 252/373 |
| 8,715,582 B1 | 5/2014 | Decker | |
| 8,999,885 B2 | 4/2015 | Majmudar | |
| 9,446,975 B2 | 9/2016 | Nickerson | |
| 9,624,109 B2 | 4/2017 | Srinivasachar | |
| 9,746,242 B2 | 8/2017 | Giebelhausen | |
| 2006/0130401 A1 | 6/2006 | Giglio | |
| 2012/0116135 A1 | 5/2012 | Gong | |
| 2020/0385273 A1 | 12/2020 | Dunnigan | |

FOREIGN PATENT DOCUMENTS

GB   WO 2020/148551 A2   1/2020

OTHER PUBLICATIONS

Nikolaidis, P.; Poulakis A. "A Comparative Overview of Hydrogen Production Processes." Renewable and Sustainable Energy Reviews 67 (2017), 597-611. Elsevier, Amsterdam, NL.
Menendez-Diaz, J. A.; Martin-Gullon, I. "Types of Carbon Adsorbents and Their Production." In Activated Carbon Surfaces in Environmental Remediation (Interface Science and Technology Series, 7), T. Bandosz, Ed., 2006, 1-48. Elsevier, Amsterdam, NL.

* cited by examiner

*Primary Examiner* — Yong L Chu
(74) *Attorney, Agent, or Firm* — Squire Patton Boggs (US) LLP

(57) ABSTRACT

Continuous thermolysis of carbonaceous matter in a controlled temperature and steam environment to produce a low volatility char, with subsequent steam activation of the char under pressure producing activated carbon and pressurized syn-gas, all of which are carried out in a reactor system including one or more vessels. The syn-gas is enriched in hydrogen in a high temperature shift reactor and separated in a pressurized swing adsorber to provide a pressurized pure hydrogen stream and a low-pressure combustible tail gas. The tail gas and the volatiles from the thermolysis step are combusted to provide process steam and electric power. The electric power is used to supplement the thermal requirements of the process with the balance being exported.

17 Claims, 4 Drawing Sheets

CONTINUOUS CARBONACEOUS MATTER THERMOLYSIS AND PRESSURIZED CHAR ACTIVATION WITH HYDROGEN PRODUCTION

TECHNICAL FIELD

The present invention relates to thermal transformation of carbonaceous matter into char and subsequent steam activation of the char under pressure with recovery of hydrogen and other combustible volatile materials and the concurrent production of power.

BACKGROUND OF THE INVENTION

Activated carbon is a versatile adsorbent extensively used for the removal of contaminants from both liquids and gases to purify desired materials or to capture specific toxins. Activated carbons are manufactured from carbonaceous materials such as biomass, coal, lignite, peat, or petroleum coke using two separate pathways—thermal treatment with mildly oxidizing reactants (steam or carbon dioxide), or a chemical approach involving degradation with acidic materials such as zinc chloride or dehydration with alkalis including potassium hydroxide. While the chemical procedure is faster and generally occurs at lower temperatures, the added costs of chemical removal and treatment of the resulting wastewater limit this approach. According to J. A. Menéndez-Díaz et al. ("Activated carbon surfaces in environmental remediation", in Interface Science and Technology Series, 7, Elsevier 2006), "Steam activation is the most widely used method for producing activated carbons in the world."

Hydrogen, a potential co-product of carbon activation, is extensively used in the refining and chemical industries, with emerging markets in the transportation sector and in energy storage. The various processes for producing hydrogen are well described in the paper "A comparative overview of hydrogen production processes" Nikolaidis et al., Renewable and Sustainable Energy Reviews, 67(2017), 597. Conventionally, hydrogen is produced by the reaction of steam with natural gas, heavy oil, and coal. However, with the changing emphasis on minimizing carbon emissions, the focus has turned towards electrolysis, using green or nuclear electricity. An alternative approach, considered renewable sourced, is the thermal treatment of biomass (woody matter, agricultural residues, animal manures, etc.) to produce a tarry gas from which hydrogen can be recovered. Such a process is described in U.S. Pat. No. 8,192,647 (Chornet).

Conventional steam activation of carbonaceous material involves two sequential reaction steps:
(1) Thermal decomposition of the carbonaceous feed (pyrolysis, devolatilization, or carbonization) to remove the non-carbon elements hydrogen and oxygen, so that the resultant product char is enriched in carbon.
(2) Thermal activation of the devolatilized char through partial oxidation with high-temperature steam-containing gases to create a porous structure having extensive surface area.

The overall activation process is endothermic and heat has to be added for the reactions to proceed. Typically, the necessary heat is provided by the combustion of the volatile gases and vapors released from the pyrolysis and activation reactions. In terms of an overall process energy balance, about 20% of the input energy is recovered in the form of activated carbon and another 25 to 35% is required for the process. Therefore about 45 to 55% is available for other purposes, but frequently it is lost to the environment, although there have been teachings to use the excess heat for power generation.

From the above description, it is seen that there exists a need in the art to consistently, concurrently, and continuously produce from a variety of carbonaceous materials:
- activated carbon with low ash and a minimal Iodine Number of over 600 but preferably over 800 while providing a clean pressurized synthesis gas essentially free of nitrogen, tar, and dust from which renewable-source high purity hydrogen can be extracted, by eliminating high-velocity process gases to minimize particulate carryover, attrition, dilution, motive power requirements, and gas clean-up costs,
- steam and power at maximum efficiency such that it is sufficient for process use but also available as renewable-source grid quality power for export, and
- co-products that are available in the pyrolysis off-gases but are never recovered.

SUMMARY OF THE INVENTION

The shortcomings of the prior art are resolved and additional advantages are realized, in part by using steam as the process heat transfer medium. Steam has almost twice the thermal capacity of the exhaust gases normally used to provide the requisite heat for pyrolysis and activation. Steam is also an excellent thermal radiator, while nitrogen, by contrast, which comprises about 70% of normal combustion gas, does not radiate heat at all. These particular properties cut the mass flow of heat transfer gases in half, but more particularly, when combined with pressurized operation, gas velocity is reduced by orders of magnitude. Low gas velocity, in conjunction with proper feedstock preparation for removal of fines and the fact that the ash remains commingled with the product activated carbon, essentially eliminates particulate carryover from the carbonization and activation gases, thus avoiding the expense of dust control which is required by both kiln and fluidized bed activation systems.

A further advantage of the present invention is that the thermolysis process is deliberately divided into multiple temperature steps and ramps with sequential steps for drying at 275 to 350° F., torrefaction at 375 to 600° F., pyrolysis at 750 to 1050° F., and devolatilization at 1300 to 1350° F.

At each of these steps, the benefits derived from the deliberate use of steam and temperature staging become apparent:
(1) Drying—in addition to thermal transfer, steam can be used to distill essential oils from certain biomass materials, which, when followed by condensation and separation of the resultant oil phase, can enhance the financial viability of the process.
(2) Torrefaction—as is illustrated in Chart 1, biomass torrefaction is exothermic and steam is required to temper overheating while also acting as a reagent in the thermolysis of the cellulosic fractions of the carbonaceous feed. Biomass, in particular, is composed primarily of cellulose, hemicellulose, and lignin with various lesser components which depend on the biomass source. Both cellulosic components thermally rupture before lignin decomposes, but particularly so under the influence of steam and at lower temperatures, which then results in simpler chemical moieties, certain of which, such as levoglucosan, hydroxyacetaldehyde, and furfural, can be recovered as dictated by market value. In addition to the condensable fraction, permanent gases are also formed, with carbon dioxide being the major component at more than 70% which introduces the possibility of additional carbon capture. The balance of the gases comprises carbon monoxide (about 10%) with hydrogen and various hydrocarbons making up the remainder. Another benefit of the reactive nature of steam is that carbonization is almost complete by the end of torrefaction, at 575° F., in contrast with temperatures of over 900° F. required for a similar conversion without steam.

(3) Pyrolysis—steam continues to influence both the chemistry and temperature of this stage of thermolytic rupture to lower the molecular weight of the product spectrum and prevent further polymerization into refractory polycyclic hydrocarbons (tar) while completing the carbonization process at lower temperatures than conventional processing.

(4) Devolatilization—in this stage steam drives off the last of the volatiles and starts to open up the pores of the char. Additional heat is necessary to maintain the required temperature in this stage, and in the present invention, this is provided by radiation from electric radiant heating elements.

The overall results of thermolysis staging are to produce a slate of recoverable materials, reduce the energy needed for the process, simplify the capture of carbon from the torrefaction gases in the form of carbon dioxide, and provide a tar-free char that facilitates the production of hydrogen.

Of major import to the staging process is the incorporation of a screw reactor as the mechanism for the thermolysis of carbonaceous matter. While screw reactors have previously been used for pyrolysis, the process of staged pyrolysis, where the thermolysis process is separated into specific controlled temperature reaction zones, has not been taught. Other conventional pyrolysis/activation reactors are unsuitable for zonal separation. As examples, kilns exhibit the complication of a rotating shell, and fluidized beds are a totally mixed reactor. Screw reactors, as described in the invention, are axially separable into distinct controlled temperature zones, such that the overarching thermolysis reaction can be subdivided as described above. Even these stages can be further subdivided to maximize energy utilization and valuable product recovery. Each stage can have separate inputs of reactant, flow rate, residence time, and thermal energy with corresponding gaseous outputs for recovery of specific materials, thus providing for fractional distillation and fractional condensation. Besides screw reactors, traveling grates with mixing plows can also be employed with similar results.

A still further advantage of the present invention is the incorporation of radiant electric heating elements, encapsulated inside temperature and pressure-resistant protective tubes and mounted substantially above the screw mechanism in the devolatilization section of the thermolysis reactor and in the activation reactor, thus preventing damage to the heaters and facilitating on-line replacement of defective heating elements. Electric radiant heating eliminates the need for large volumes of combustion exhaust gas, which would otherwise be necessary to provide the significant endothermic reaction heat of activation, 131.3 kJ/mol, with the concomitant problem of product entrainment and gas clean-up. Furthermore, operation of the activation reactor with electric radiant heat produces a synthesis gas free of diluent nitrogen and carbon dioxide, but more importantly avoids the potential for product loss due to excess oxygen, almost always present in the combustion gas. Only with electric radiant heat does it become viable to recover hydrogen, otherwise the financial requirements to cool, compress and re-cool large volumes of combustion gas, followed by the separation of hydrogen from such a diluted gas, become prohibitive.

Joule heating of biomass by passage of electric current has been taught, but its effectiveness is limited by inconsistent current flow created by the heterogeneous nature of biomass. The method taught in the present invention, by contrast, employs predictable and controlled radiative heat. An added benefit of radiative heat is that it is very much more efficient than convective heat which is the dominant mode of heat transfer for hot exhaust gas. Correspondingly, the radiative surface (protective tube for the electric heating element) is not required to be much hotter than the char surface, which increases the range of materials suitable for the tube's fabrication.

According to the method claimed in the present invention, there is sufficient process heat available from the activation and shift reactors to provide the steam requirements of both the activation and shift reactors as well as the power for the boiler feedwater pumps.

An advantage of operating the activation reactor pressurized with steam as claimed in the present invention is that synthesis gas is produced at a suitable pressure for separation and purification of hydrogen. Pressurizing boiler feedwater to 150 to 1000 psig takes 40 times less power than would be required to compress synthesis gas from atmospheric to similar pressures. Another benefit of operating at such steam pressures is that equivalent activation can occur at lower temperatures.

A still further advantage of the use of pressurized steam as a heat transfer medium and carrier gas is that, if the thermolysis gases are used for powering a combined cycle gas turbine, the steam used to promote heat transfer acts as a remote source of steam injection and thus increases the power output of the turbine by more than 20%.

The apparatus and method of the invention, constituting a system for continuous production of activated carbon, hydrogen, process steam, and electric power from biomass and other carbonaceous feedstocks, includes a staged thermolysis reactor, an activation reactor, hydrogen separation equipment, and a power plant.

The thermolysis reactor comprises an elongated, refractory insulation lined vessel, disposed horizontally or at an angle of up to 25 degrees above horizontal, capable of operation at pressures up to 1,000 psig, in which is disposed a collinear longitudinal conveyance mechanism for continuously moving the carbonaceous matter progressively from the inlet end to the discharge end. The longitudinal conveyance mechanism may be selected from the group consisting of a single rotary screw with cut flights and/or mixing paddles, a shaftless screw, and a plurality of identical rotary screws intermeshing with the flighting of adjacent rotary screws, or a traveling grate with mixing plows. Disposed below the longitudinal conveyance mechanism is an apparatus for staged injection of steam at mass flows and temperatures sufficient to produce sequential zones for drying, torrefaction, pyrolysis, and devolatilization of the carbonaceous matter. Disposed near the top of the reactor in the devolatilization zone are radiant electric heating elements to support the thermal requirements of this zone. The inlet and discharge apparatus of the vessel acts to minimize the ingress of air to and egress of gases and vapors from the vessel, and may be selected from the group consisting of lock hoppers, rotary valves, piston feeders, and plug-forming feeders.

In the thermolysis reactor, four separate thermal processes occur in sequence:

Drying of the carbonaceous material with controlled direct steam heat such that the average particle temperature is raised to between 275 and 350° F. With certain biomass feedstocks, the steam stripped vapor may be condensed to recover valuable essential oils.

Torrefaction of the carbonaceous matter by increasing the dry feedstock temperature from 375 to 600° F. with steam acting both as a means of facilitating thermal control and as a reactant to enhance prompt decomposition of the carbonaceous material into volatile, but stable low molecular weight compounds and to promote early char formation while minimizing the overall thermal requirements for carbonization. Depending on the nature of the carbonaceous material, torrefaction can be exothermic.

Pyrolysis of the torrefied material by raising its temperature to 750-1050° F., driving off additional volatiles and producing pyrolysed char.

Devolatilization of the pyrolysed char using radiant electric heat to increase particle temperatures to 1300 to 1350° F. with steam acting primarily as a reactant but also as a sweep agent to remove the remainder of the volatiles from the char while improving the porosity of the char.

The scope of the invention also includes various combinations of the above-described four zones, for example combining the drying and torrefaction zones, combining the torrefaction and pyrolysis zones, combining the pyrolysis and devolatilization zones, and combining the drying, torrefaction, and pyrolysis zones.

In each of these process steps, steam also acts as a carrier gas to sweep the volatile chemicals from the reaction environment and to avoid further polymerization into refractory chemicals. As desired, essential oils and other valuable chemicals can be recovered from the off-gases by venting them at particular temperature zones in the process through gas exit ports variously located on the upper surface of the containment vessel, followed by fractional condensation. Each of the zones is independently thermally controlled by steam temperature and flow. The respective process zones can be further subdivided to meet specific requirements to accommodate variations in the carbonaceous material, particle size, inlet moisture content, and the production of particular chemical compounds. Residence time can also be varied to meet the special properties of the various feedstocks, by controlling fill rate and conveyance speed.

Volatile materials from the drying, torrefaction, pyrolysis, and devolatilization zones flow to provide fuel for combustion apparatus to support steam raising and power generation. Optionally, carbon dioxide can be recovered for use or sequestration.

The activation reactor receives the char produced in the thermolysis reactor and is similar in construction. The activation reactor comprises an elongated, refractory insulation lined vessel, disposed horizontally or at an angle of up to 25 degrees above horizontal, capable of operation at pressures in the range of 150 to 1,000 psig, preferably in the range of 300 to 600 psig, in which is disposed a collinear longitudinal conveyance mechanism for continuously moving the char progressively from the inlet end to the discharge end at a speed that results in a residence time of the char of preferably at least 30 minutes, more preferably at least 45 minutes. Superheated steam is introduced at the working pressure through apertures located beneath the longitudinal conveyance apparatus, and an array of electric radiant heating elements mounted in the vapor space above the screw add sufficient thermal energy to maintain a working temperature of up to 1,800° F., preferably in the range of 1,500 to 1,700° F. The synthesis gas from the activation reactor flows through hydrogen enrichment, heat recovery, purification, and compression apparatus where high purity hydrogen is produced. Residual tail gases from the purification apparatus provide fuel for additional steam raising and power generation. The tail gases contain about 60% carbon dioxide, and this can be recovered for use or sequestration.

The activation reactor uses radiant electric heat to provide the energy required by the endothermic activation reaction, with pressurized steam providing both reaction and sweep functions to convert the char into activated carbon and pressurized synthesis gas, both of which are separately discharged for further processing. Residence time and temperature are controlled as dictated by the nature and properties of the feedstock to produce various grades of activated carbon with Iodine Numbers at least 600 and preferably at least 800.

The apparatus incorporating the thermolysis and activation reactors may be contained in a single pressure vessel operated at a single pressure, with thermal decomposition of the feedstock to char occurring in the forward section and activation occurring in the rearward section and having a partial restriction located at the juncture of the thermal steam environments to minimize intermixing of the thermolysis product gases with the activation synthesis gas.

Other embodiments utilize two or more separate vessels for the thermolysis and activation reactors and if operating at a single pressure only requiring drop chutes between vessels, or if operating at two distinctly different pressures, separated by lock hoppers or similar devices isolating the pressure transitions. In these embodiments, disposing each vessel at an angle up to 25 degrees above horizontal facilitates placement of the array of vessels beside each other rather than having to stack them. A further embodiment utilizes devolatized char sourced externally but processed in a pressurized activation reactor as described above to produce commercial quality activated carbon, high purity hydrogen and power It is an object of the present invention to maximize the yield of high-quality activated carbon and hydrogen while optimizing steam and power production and minimizing capital and operating costs.

It is another object of the present invention to minimize the impact on the environment by making maximum use of all available energy entering the process to produce high purity, commercial-grade renewable-source hydrogen and renewable-source electricity suitable for interconnection to the power grid while sequestering carbon and ash in the activated carbon product, and by capturing pure carbon dioxide for use or sequestration.

It is yet another object of the invention to provide flexibility in the operation of the thermolysis process to recover a variety of selected chemicals as dictated by market opportunities.

It is a still further object of the present invention to operate the thermolysis and activation zones of the apparatus at separable pressures to optimize the overall output of the downstream power equipment.

It is still another object of the present invention to provide separation of the thermolysis and activation gases concurrently while allowing continuous conveyance of char by installing geometric restrictions at the zonal interface.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings, in which:

FIGS. 2 and 3 are extensions of FIG. 1, schematically depicting examples of various components and processes for energy recovery, electric power generation, and hydrogen gas recovery to comprise a complete system fully accomplishing the objects and advantages of the present invention.

DETAILED DESCRIPTION

The present invention relates to a method and apparatus for converting carbonaceous matter to activated carbon, hydrogen, electrical power, and optionally valuable chemicals derived from lignocellulosic feedstocks, in contained and controlled thermal steam environments, and constitutes:

(1) A first elongated vessel (thermolysis reactor), optionally operated under pressure and partially electrically heated, acting to continuously dry, torrefy, pyrolyse, and devolatilize carbonaceous matter to low-volatility char while releasing various gases and vapors, the more valuable of which may be recovered with the balance being combusted to recover energy and steam;

(2) A second elongated vessel (activation reactor), operated under pressure and electrically heated, acting to continuously steam activate the resulting char, producing marketable activated carbon while releasing synthesis gas for further processing first by shift conversion means to increase hydrogen content and subsequently by separation and purification of hydrogen under pressure while recovering energy and steam by combusting the tail gas discharged from the hydrogen separator; and (3) Heat exchangers and a power plant producing the steam and electricity required for the process.

Figure 1:
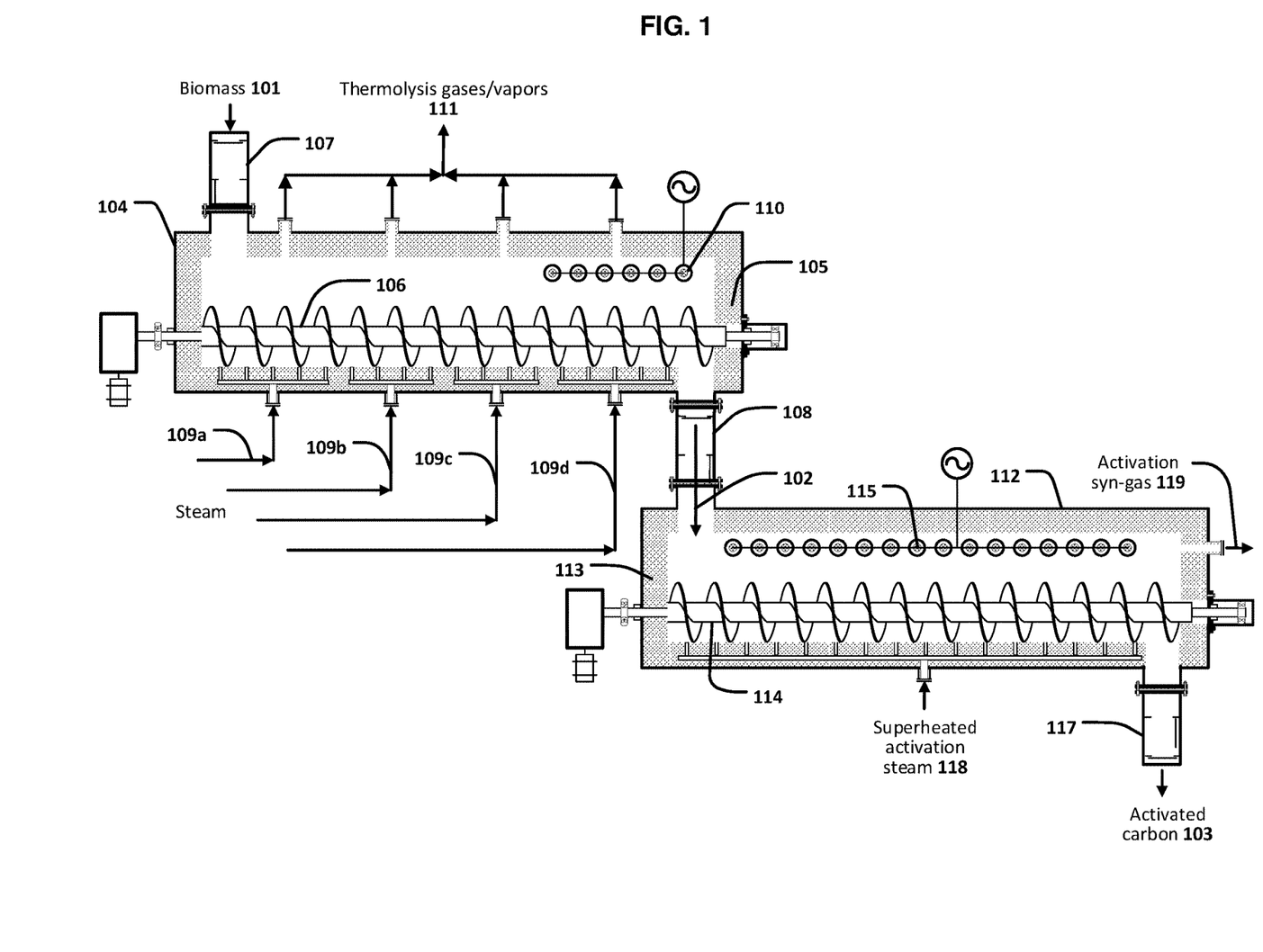
FIG. 1 is a schematic incorporating the essential features of the apparatus and method claimed in the present invention.

With reference to FIG. 1, according to an embodiment of the invention, biomass, of a maximum average dimension of less than 2 inches, and preferably derived from agricultural and forest sources selected for suitability in producing commercial quality activated carbon, such as chipped, hogged, or pelletized orchard removal wood, nut shells, stone fruit and olive pits, and forest removal wood, is dried if necessary to preferably less than 15%, and more preferably less than 7% moisture content, thus constituting dried biomass 101. Drying processes in common use are employed and are not shown. The dried biomass 101 is fed at a controlled rate through lock hopper 107 into a first elongated vessel 104 (thermolysis reactor) lined internally with refractory thermal insulation and abrasion resistant hot face refractory 105. Thermolysis reactor 104 is operated at a pressure ranging from near atmospheric to 1,000 psig, dictated by the requirements of the power plant selected (steam boiler Rankine cycle or gas turbine/combined cycle respectively). Besides lock hoppers, other commercially available feeder equipment which isolate the interior of the vessel from the exterior atmosphere of the vessel, such as rotary valves, piston feeders, and plug-forming feeders, may also be used.

Screw 106 gently mixes and transports the dried biomass 101 across the bottom of the first vessel 104. The screw 106 may be configured as a single screw with cut flights, a single screw with mixing paddles, a shaftless screw, multiple identical screws, screws with flights having pitches differing along the shaft length, and screws with shaft diameter differing along the shaft length, driven by a variable speed drive and optionally cooled by passage of a heat transfer fluid through the shaft. The screw 106 may instead be configured as a traveling grate with mixing plows.

Thermal processing occurs in four stages, as identified above, with optionally superheated steam flows 109a, 109b, 109c, and 109d injected into the vessel independently along the bottom acting to completely dry, torrefy, pyrolyse, and devolatilise the biomass in sequence while raising its temperature in stages to 1300 to 1350° F. with the steam moving upwards through the biomass and driving off water and the volatile organic compounds before they polymerize into higher molecular weight compounds. The steam, optionally superheated, 109a introduced into the drying zone acts to raise the temperature of the dried biomass to a range of 275 to 350° F. while sweeping out the moisture in the biomass along with distilled oils. The steam 109b introduced into the torrefaction zone acts to moderate the rapid temperature rise in this stage and to maintain the temperature within the limits of the torrefaction process, 375 to 600° F. The controlled flow of superheated steam 109c is introduced into the pyrolysis zone at a temperature sufficient to ramp and hold the temperature at the pyrolysis conditions of 750 to 1050° F. and acts to sweep out pyrolysis products. The exothermic reactions are rapid once initiated, and the residence time of biomass undergoing thermolysis can be as short as 10 minutes depending on feedstock moisture and particle size. The high temperature superheated steam 109d introduced into the devolatilization zone at a relatively low flow rate acts to sweep out the remaining volatiles while the char temperature rises to between 1300 and 1350° F. In the final section of thermolysis reactor 104, the temperature is controlled by radiant electric heaters 110 disposed in the vapor space of the vessel substantially above the screw mechanism. The radiant electric heating elements are placed within temperature and pressure resistant protection tubes transverse to the longitudinal axis of the vessel, and so they are individually replaceable on line. The steam acts to minimize production of higher molecular weight polyaromatic compounds such as tars, leaving the finished char 102 containing Dry Ash Free (DAF) matter greater than 80%, and preferably greater than 95%, and containing essentially all of the ash present in the feedstock 101.

Figure 2:
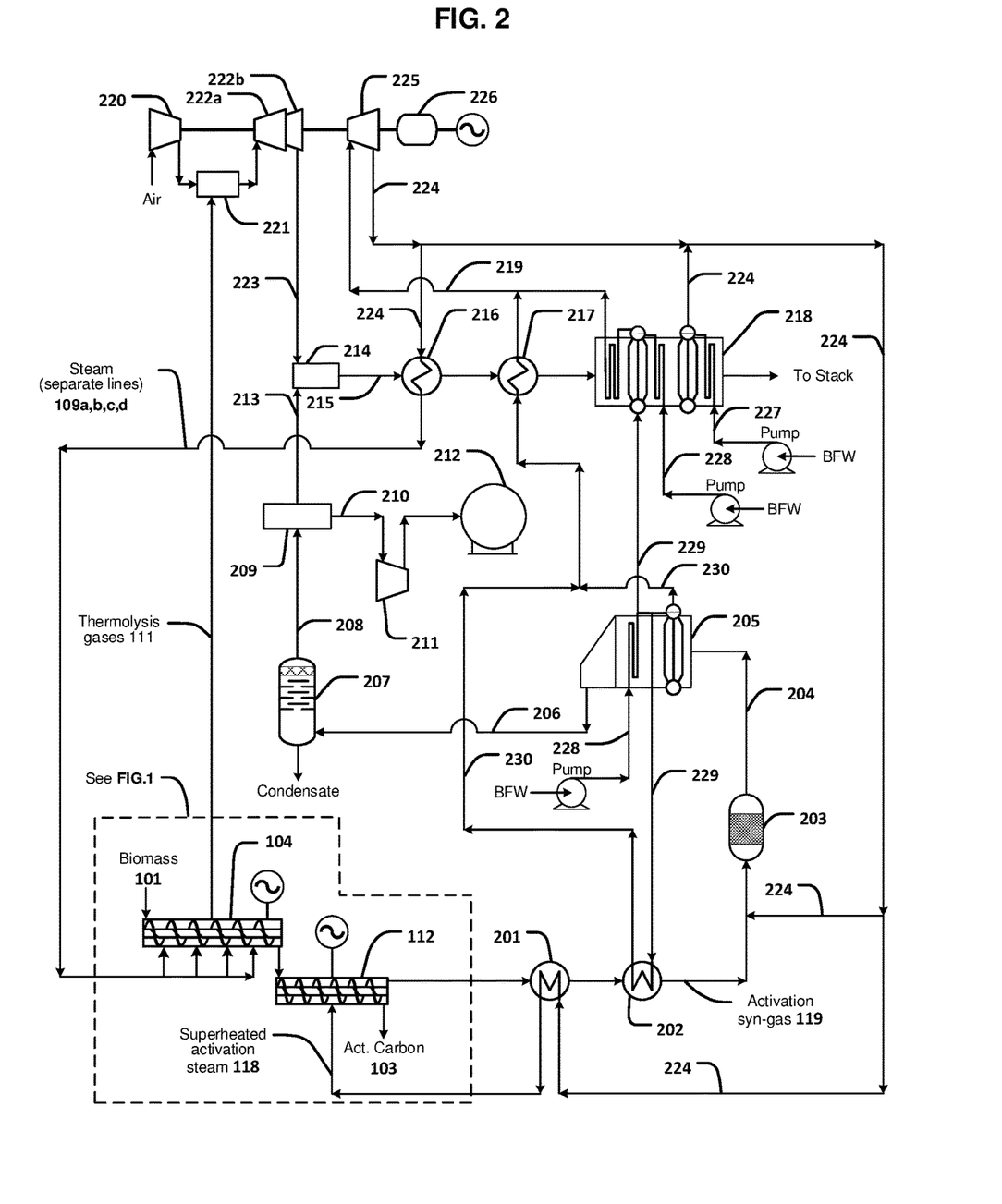
FIG 2 depicts an embodiment employing a combined cycle gas turbine generator.

The hot thermolysis gases and vapors 111, along with the steam, are discharged from the thermolysis reactor at one or more discharge ports as dictated by the requirements for chemicals recovery. If the thermolysis reactor is operated at a pressure in the range 150 to 600 psig, the hot thermolysis gases and vapors 111 are suitable for powering a gas turbine without further compression, as shown in FIG. 2, thus saving considerable energy and capital cost. Hot thermolysis gases and vapors at near atmospheric pressure are suitable for firing a boiler as described in FIG. 3. The resulting char 102 drops into lock hopper 108. Since the ash contained in the biomass feedstock 101 remains in the char and the velocity of the steam sweeping out the pyrolysis products is low, the thermolysis gases and vapors 111 are essentially free of particulate matter although their composition will vary based on the nature of the biomass feedstock.

In the embodiment shown in FIG. 1 with both vessels operating at the same pressure, lock hopper 108 from the first vessel 104 (thermolysis reactor) to the inlet of the second vessel 112 (activation reactor) can be of light duty design. However, if the first vessel is operating at 2 psig or less, inlet lock hopper 107 can be of light duty design while lock hopper 108 becomes the primary pressure seal for the inlet of the second vessel 112 (activation reactor) and should be of severe duty design. In other embodiments, the thermolysis reactor may be operated at near atmospheric pressure, at a pressure equal to that in the activation reactor, or at various other pressures.

In another embodiment, the char 102 is cooled and packaged for sale and there is no activation reactor.

The activation reactor 112 is designed similarly to the thermolysis reactor. It is an elongated vessel of circular cross section, lined internally with refractory thermal insulation and abrasion resistant hot face refractory 113, and may be operated at pressures ranging from 150 to 1000 psig, but preferably in the range of 300-600 psig, to facilitate separation of hydrogen under pressure. Screw 114 gently mixes and transports the char 102 across the bottom of the reactor as it undergoes activation. The screw 114 may be configured as a single screw with cut flights, a single screw with mixing paddles, a shaftless screw, multiple identical screws, screws with flights having pitches differing along the shaft length, and screws with shaft diameter differing along the shaft length, driven by a variable speed drive and optionally cooled by passage of a heat transfer fluid through the shaft. The screw 114 may instead be configured as a traveling grate with mixing plows.

To develop the necessary pore structure for a commercial grade activated carbon, the rate of oxidation is deliberately controlled by the flow of steam and the operating temperature such that the time for activation exceeds 30 minutes and preferably more than 45 minutes. The activation process is endothermic with the necessary reaction heat being provided by electric radiant heating elements 115. The radiant electric heating elements are placed within temperature and pressure resistant protection tubes transverse to the longitudinal axis of the vessel and mounted within the vapor space substantially above screw 114, so they are individually replaceable on-line. Superheated activation steam 118 is injected along the bottom, moving upwards through the char undergoing activation. The output of the radiant electric heating elements is controlled to maintain the temperature in the range of preferably 1400 to 1800° F. and more preferably 1,500 to 1,700° F. The superheated activation steam reacts with the char, forming micro pores and releasing hot pressurized activation syn-gas 119 composed mostly of hydrogen and carbon monoxide while the char becomes activated. Producing syn-gas at a pressure greater than 150 psig avoids a very expensive and energy intensive compression step otherwise required prior to separation of hydrogen by pressure swing adsorption. The activated carbon product 103 is discharged through lock hopper 117, cooled, and packaged for sale. The activation process is controlled to produce activated carbon with an Iodine Number of preferably greater than 600 and more preferably greater than 800. Since the activated carbon contains all of the ash originally present in the biomass feedstock and the velocity of the steam sweeping out the syn-gas is low, the activation syn-gas 119 is essentially free of particulate matter.

In the embodiment shown on FIG. 1, the activation reactor 112 produces activated carbon from the char 102 discharged from the thermolysis reactor 104. In another embodiment, activation reactor 112 produces activated carbon and hydrogen from imported pyrolyzed solid carbonaceous matter, such as char from biomass, char from peat and lignite, spent activated carbon, and coke. In this activation-only embodiment, the sensible heat in the hot pressurized activation syngas 119 is sufficient to generate and superheat the activation steam 118.

In another embodiment, the thermolysis reactor and activation reactor are disposed as a single reactor operated at a single operating pressure preferably in the range of 150 to 600 psig. In this embodiment, thermolysis occurs in the section nearest the inlet and activation in the section nearest the outlet. At the interface between the devolatilization zone of the thermolysis section and the activation section, a partial restriction in cross section, supplemented by a decrease in pitch length of the screw, minimizes the interchange of thermolysis products with synthesis gas.

In another embodiment, either or both of the thermolysis and activation reactors are disposed as multiple interconnected vessels in series, each disposed at an angle of up to 25 degrees above horizontal to facilitate placement side by side, with an inlet end in the first vessel, discharge and inlet ends of intermediate vessels conjoined, and a discharge end from the last vessel.

In a still further embodiment, a portion of the char produced in the thermolysis reactor is diverted for further processing or sale and the remainder is introduced into the activation reactor.

FIG. 2 includes a smaller scale rendition of FIG. 1 for reference, and depicts schematically one of several possible configurations of equipment items constituting a complete system realizing all of the objects and advantages of the present invention, notably employing a combined cycle gas turbine generator for maximum recovery of energy from the volatile products released from the biomass and char being processed.

In this embodiment, thermolysis reactor 104 is operated at above atmospheric pressure, preferably in the range of 150 to 1000 psig, more preferably 250 to 600 psig, at a pressure suitable for a gas turbine combustor without requiring further compression of the fuel gas. As the dried biomass 101 is thermolysed to high-carbon char, hot pressurized thermolysis gases and vapors 111 are directed to gas turbine combustor 221 where compressed air from air compressor 220 provides combustion air. The steam carried out of the thermolysis reactor 104 lowers the combustor flame temperature, effectively reducing the power requirement for air compression and improving the gas turbine efficiency by up to 20%. The combustion products power the gas turbine set 222a and 222b. Gas producer turbine expander 222a powers air compressor 220, and power producer turbine expander 222b is connected to the electric generator 226. Turbine exhaust 223 from gas turbine set 222a and 222b still contains sufficient oxygen to support further combustion and is used as the oxidizing gas in tail gas combustor 214 to combust the low-pressure tail gas 213 from pressurized swing adsorbers 209. Heat is recovered from tail gas combustor exhaust 215 in steam superheater 216, high pressure steam superheater 217, and heat recovery steam generator 218 in series. The cooled tail gas combustor exhaust is treated as required by air pollution regulations and discharged to atmosphere. Back pressure steam turbine 225 is on a common shaft with power producer gas turbine expander 222b and electric generator 226. Back pressure steam turbine 225 is powered by high pressure superheated steam 219 generated in the upstream section of heat recovery steam generator 218, supplemented by saturated high-pressure steam 230 heated by high pressure steam superheater 217. A portion of the medium pressure exhaust steam 224 from back pressure steam turbine 225 is reheated to various temperatures in thermolysis steam superheater 216 to constitute superheated steam 109a, 109b, 109c, and 109d for the thermolysis reactor 104. The remainder of medium pressure steam 224, supplemented by similar quality steam from the downstream section of heat recovery steam generator 218, is added to cooled syn-gas upstream of shift reactor 203, providing enough steam to convert up to 84% of the carbon monoxide in the activation syn-gas to additional hydrogen, with the remainder being heated in activation reactor superheater 201 to become superheated activation steam 118.

Gas turbine compressor 220, gas turbine set 222a and 222b, back pressure steam turbine 225, and electric generator 226, together with tail-gas combustor 214 and heat recovery steam generator 218, constitute a combined cycle gas turbine power plant. About 60% of the electric power is consumed by the radiant electric heating elements in the thermolysis and activation reactors, the hydrogen compressor 211, feedstock preparation and handling, pumps, and blowers. The net excess is sold to the local electric grid operator.

As the char is activated under pressure in the activation reactor 112, hot pressurized activation syn-gas 119 is generated. Activation steam superheater 201 partially cools the syn-gas while heating medium pressure steam 224 to constitute superheated activation steam 118. The activation syn-gas is further cooled in activation gas boiler 202 to a temperature suitable for conversion of carbon monoxide to hydrogen in high temperature shift reactor 203 while generating saturated high-pressure steam 230 from hot high-pressure boiler feedwater 229 heated in the downstream section of shift exit gas boiler 205. Medium pressure steam 224 is added upstream of high temperature shift reactor 203, providing enough steam to convert up to 84% of carbon monoxide to hydrogen, producing hydrogen-rich syn-gas 204. Shift reactor exit gas boiler 205 finally cools the hydrogen-rich syn-gas and condenses most of the water present in the gas to produce cooled wet syn-gas 206 at a temperature suitable for efficient hydrogen recovery in pressurized swing adsorbers 209. Demister 207 removes the final traces of water droplets from the cooled wet syn-gas 206, producing cooled dry syn-gas 208. Hydrogen 210 is separated from cooled dry syn-gas 208 in pressurized swing adsorbers 209 at a pressure not materially less than the operating pressure in activation reactor 112, and is further compressed by compressor 211, and stored in pressure vessel(s) 212 as a product for sale. The hydrogen purity is preferably greater than 95%, more preferably greater than 99%. Low pressure tail gas 213, containing the remaining volatile constituents and carbon dioxide, essentially free of particulate matter, is combusted in tail gas combustor 214 as described above.

As an example of this embodiment shown in FIG. 2, 54.93 tons per hour of walnut shells at 7% moisture is reacted with 100.2 tons per hour of steam to produce 1.43 tons per hour of hydrogen, 6.59 tons per hour of activated carbon, and 12.43 tons per hour of condensate. An additional 407.61 tons per hour of air are required to combust the volatile vapors from the thermolysis reactor and the tail gas from the pressure swing adsorbers while producing 542.29 tons per hour of flue gas with negligible particulate matter.

In terms of energy, the higher heating value of the walnut shells input to the process is 890.5 MMBtu per hour which produces 174.2 MMBtu per hour of hydrogen, 174.1 MMBtu per hour of activated carbon, and 68.3 MMBtu per hour of excess energy converted into electric power available to be supplied to the grid for an overall energy efficiency of 47%—higher than the average fossil-fueled, utility power plant in the USA at 36% and natural gas fired utility plant at 44%. The balance, non-recoverable waste heat, is released through the stack as a combination of latent heat and sensible heat with additional thermal losses from process equipment and plant power requirements.

The overall power balance for the embodiment shown in FIG. 2 is described in Table 1. It should be noted that by injecting pressurized steam as a thermal medium and a reagent into the thermolysis process, the gas turbine efficiency is increased from 37.2 to 45.9% while adding an extra 12.8 MW of power.

TABLE 1

ELECTRIC POWER BALANCE FOR GAS TURBINE EXAMPLE

| Process Unit | Produced (MW) | Required (MW) |
|---|---|---|
| Thermolysis Reactor 104 | | 6.83 |
| Activation Reactor 112 | | 20.05 |
| Gas Power Producer Turbine 222b | 44.86 | |
| Steam Turbine 225 | 6.80 | |
| Boiler Feedwater Pumps | | 0.27 |
| I.D. + F.D. Blowers | | 0.95 |
| Hydrogen Compressor 211 | | 2.81 |
| Feedstock Prep & Miscellaneous | | 0.73 |
| Totals | 51.66 | 31.63 |
| Net Available for Export | 20.03 | |

Figure 3:
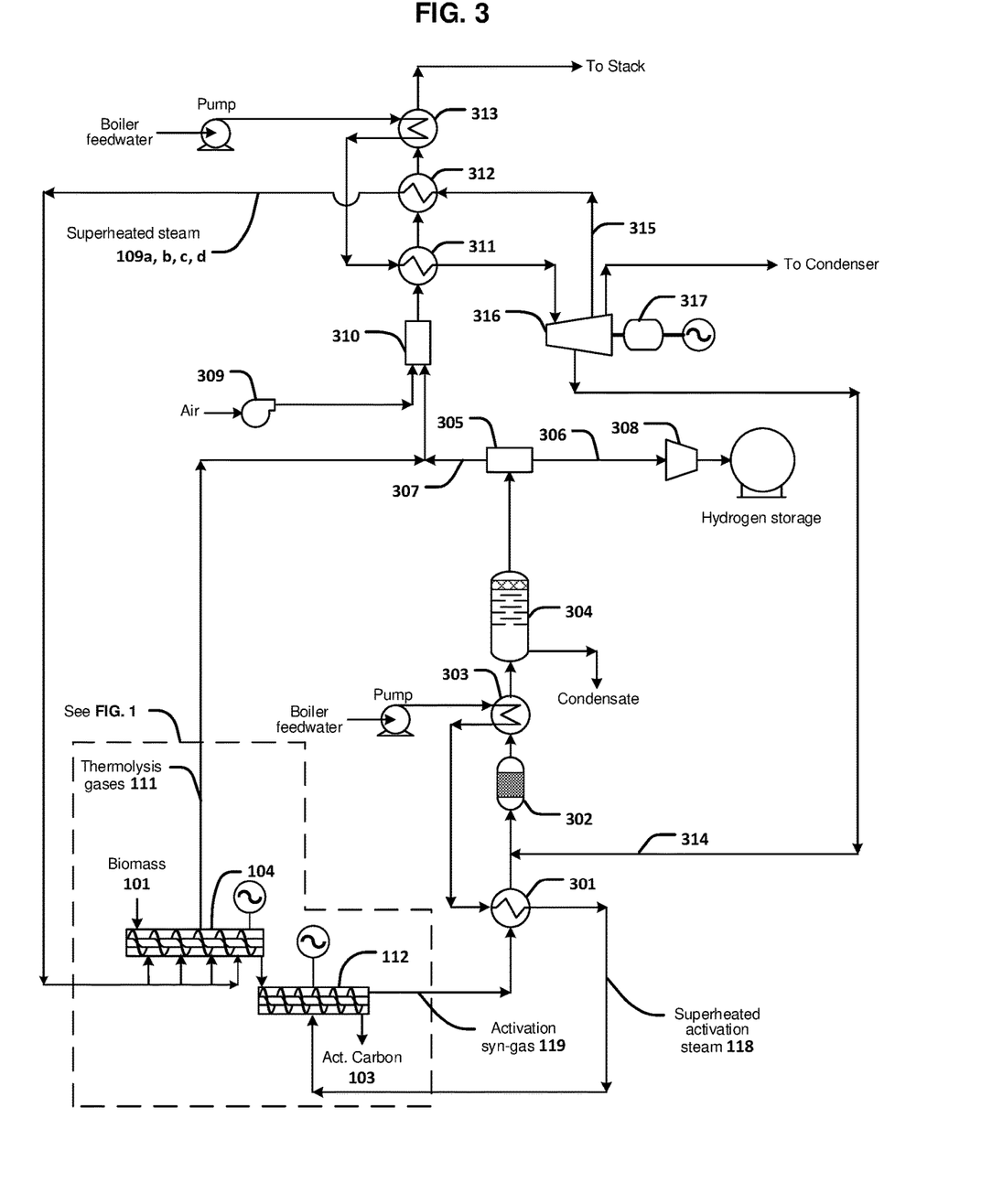
FIG. 3 depicts an embodiment employing a boiler and steam turbine generator.
Figure 4:
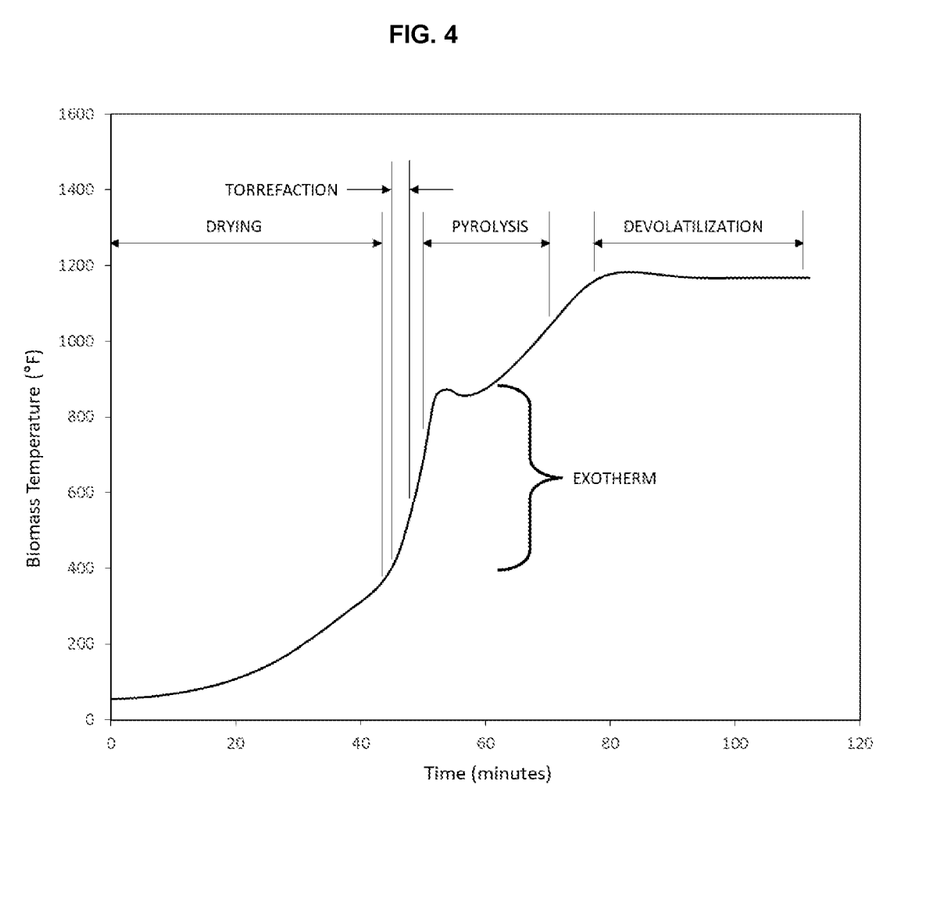
FIG. 4 illustrates the four stages of thermolysis (i.e., drying, torrefaction, pyrolysis, and devolatilization), shown for a biomass heating rate of 18° F. (10° C.) per minute up to the devolatilization stage.

FIG. 3 includes a smaller scale rendition of FIG. 1 for reference, and depicts schematically another of several possible configurations of equipment items constituting a complete system realizing all of the objects and advantages of the present invention, notably employing a boiler and steam turbine generator. Although this configuration results in less net electrical energy production than the combined cycle gas turbine configuration due to the lower thermal efficiency of the Rankine cycle, and is likely to be more expensive to construct due to larger heat transfer area, the fuel quality and quantity of the thermolysis products used as fuel is expected to vary considering the variety of feedstocks anticipated, and a boiler system, because of its large thermal reservoir, is more tolerant of these variations than a gas turbine train.

In this embodiment, thermolysis reactor 104 is operated at 1 to 5 psig to compensate for piping and valve losses. As the dried biomass 101 is thermolysed to high-carbon char, hot thermolysis gases and vapors 111 essentially free of particulate matter are combined with pressurized swing adsorber tail gas 306, which is also essentially free of particulate matter and contains the remaining permanent gases after hydrogen separation. The combined gases and vapors are combusted in pyrolyser and tail gas combustor 310 with air from combustion air blower 309, and the hot flue gases are cooled sequentially in thermolysis combustion superheater 311, thermolysis steam reheater 312, and thermolysis combustion boiler 313. Cooled flue gas from thermolysis combustion boiler 313 is treated as required by air pollution regulations and discharged to atmosphere. Thermolysis combustion boiler 313 generates saturated steam from high pressure boiler feedwater, and this steam is superheated in thermolysis combustion superheater 311 and powers extraction steam turbine 316 which runs electric generator 317. Exhaust steam from turbine 316 is condensed and the condensate returned as a portion of the required feedwater for the various boilers in the system. This low Btu gas-fired, high pressure boiler plant produces both power for plant use and grid supply while also providing low and medium pressure process steam. Partially cooled flue gas from thermolysis combustion superheater 311 is further cooled in thermolysis steam reheater 312 which reheats low pressure extraction steam 315 from steam turbine 316 to various temperatures, constituting superheated steam 109a, 109b, 109c, and 109d for the thermolysis reactor 104. The power from electric generator 317 is consumed by the radiant electric heating elements in the thermolysis and activation reactors, the hydrogen compressor 308, feedstock preparation and handling, pumps, and blowers. The net excess is sold to the local electric grid operator.

As the char is activated under pressure in the activation reactor 112, hot pressurized activation syn-gas 119 is generated. Activation steam superheater 301 simultaneously cools the syn-gas to a temperature suitable for conversion of carbon monoxide to hydrogen in high temperature shift reactor 302 while superheating medium pressure steam to constitute superheated activation steam 118. Medium pressure steam 314 extracted from steam turbine 316 is added to the syn-gas upstream of high temperature shift reactor 302 so that enough steam is present to convert up to 84% of carbon monoxide to hydrogen. Activation gas boiler 303 cools the shift reacted hydrogen-rich syn-gas to a temperature suitable for efficient hydrogen recovery in pressurized swing adsorbers 305 while simultaneously generating steam to be superheated in activation steam superheater 301. The cooled hydrogen-rich syn-gas from activation gas boiler 303 carries water vapor which is removed in condenser/demister 304. Hydrogen 306 is separated from the cooled syn-gas in pressurized swing adsorbers 305 at a pressure not materially less than the operating pressure in activation reactor 112, then further compressed by compressor 308 and stored in pressure vessel(s) as a product for sale. The hydrogen purity is preferably greater than 95%, more preferably greater than 99%.

As an example of this embodiment shown in FIG. 3, 54.93 tons per hour of walnut shells at 7% moisture is reacted with 100.2 tons per hour of steam to produce 1.43 tons per hour of hydrogen, 6.59 tons per hour of activated carbon, and 12.43 tons per hour of condensate. An additional 230.5 tons per hour of air are required to combust the volatile vapor from the thermolysis reactor and the tail gas from the pressure swing adsorbers while producing 365.27 tons per hour of flue gas with negligible particulate matter.

In terms of energy, the higher heating value of the walnut shells input to the process is 890.5 MMBtu per hour which produces 174.2 MMBtu per hour of hydrogen, 174.1 MMBtu per hour of activated carbon, and 52.0 MMBtu per hour of excess electricity available to be supplied to the grid, for an overall energy efficiency of 44%. The balance, non-recoverable waste heat, is released through the stack as a combination of latent heat and sensible heat with additional thermal losses from process equipment.

The overall power balance for the example of the embodiment shown in FIG. 3 is described in Table 2.

TABLE 2

ELECTRIC POWER BALANCE FOR STEAM TURBINE EXAMPLE

| Process Unit | Produced (MW) | Required (MW) |
|---|---|---|
| Thermolysis Reactor 104 | | 7.41 |
| Activation Reactor 112 | | 20.05 |
| Steam Turbine 316 | 47.54 | |
| Boiler Feedwater Pumps | | 0.78 |
| I.D. + F.D. Blowers | | 0.51 |
| Hydrogen Compressor 308 | | 2.81 |
| Feedstock Prep & Miscellaneous | | 0.73 |
| Totals | 47.54 | 32.29 |
| Net Available for Export | | 15.25 |

All publications, patents, and patent applications mentioned in this specification are indicative of the level of skill of those skilled in the art to which the invention pertains, and are herein incorporated by reference to the same extent as if each were set forth in full.

Although the description above contains many specifics, these should not be construed as limiting the scope of the invention, but as merely providing illustrations of some of the presently conceptualized embodiments of the invention. It will be appreciated that the scope of the invention fully encompasses other embodiments which may become obvious to those skilled in the art; however, the definitive scope of the invention is determined by the appended claims and their legal equivalents.

What is claimed is:

1. A system for continuous, concurrent production of activated carbon, hydrogen, process steam, and electric power from carbonaceous matter, comprising:
a thermolysis reactor wherein carbonaceous matter is processed in individually temperature-controlled zones for sequentially drying, torrefying, pyrolysing, and devolatilizing the carbonaceous matter to produce char and volatile materials, the thermolysis reactor comprising a carbonaceous matter inlet, a char outlet, means for moving the carbonaceous matter from the carbonaceous matter inlet to the char outlet, means for admitting steam at various locations within the zones for sequentially drying, torrefying, pyrolysing, and devolatilizing the carbonaceous matter, the steam acting variously to facilitate chemical reactions, to sweep volatile materials out of the thermolysis reactor and to provide controlled thermal energy, a radiant electric heat distribution system acting to control the temperature within the devolatilization zone, and an array of volatile materials outlets, conjoined with a pressurized activation reactor wherein the char is reacted with pressurized steam to produce activated carbon and pressurized synthesis gas, the pressurized activation reactor comprising a char inlet, an activated carbon outlet, means for moving the char from the char inlet to the activated carbon outlet, means for admitting steam, the steam acting as a reactant for char activation, a radiant electric heat distribution system acting to provide the endothermic heat of reaction, and a pressurized synthesis gas outlet;

separation means at the junction of the thermolysis reactor and the pressurized activation reactor acting to effectively isolate the interior environment of the thermolysis reactor from the interior environment of the pressurized activation reactor while allowing passage of the char from the thermolysis reactor into the pressurized activation reactor;

means for admitting carbonaceous feed into the thermolysis reactor and for discharging activated carbon from the pressurized activation reactor while maintaining the various working pressures therein and minimizing the ingress of air and egress of gases and vapors to atmosphere;

means for recovering heat from the pressurized synthesis gas by generating steam while cooling and dehumidifying the pressurized synthesis gas and producing cooled and dehumidified pressurized synthesis gas;

a hydrogen purification system producing purified hydrogen, and combustible tail gas, from the cooled and dehumidified pressurized synthesis gas;

means for compression and storage of the purified hydrogen;

a power island comprising means for combustion, process steam raising, heat exchange, and electric power generation, fueled by the volatile materials discharged from the thermolysis reactor and the tail gas discharged from the hydrogen purification system;

means for delivering electric power from the power island to the radiant electric heat distribution systems of the thermolysis reactor and the pressurized activation reactor; and means for delivering steam from the power island to the thermolysis reactor and steam from the means for recovering heat from the pressurized synthesis gas to the pressurized activation reactor.

2. The system as described in claim 1 wherein the means for moving carbonaceous matter through the thermolysis reactor and the means for moving the char through the pressurized activation reactor variously are a screw means selected from the group including a single screw with cut flights, a single screw with mixing paddles, a shaftless screw, multiple identical screws, screws with flights having pitches differing along the shaft length, and screws with shaft diameter differing along the shaft length.

3. The system as described in claim 1 wherein the means for moving carbonaceous matter through the thermolysis reactor and the means for moving the char through the pressurized activation reactor variously are a traveling grate with mixing plows.

4. The system as described in claim 1 wherein the radiant electric heat distribution systems of the thermolysis reactor and the pressurized activation reactor comprise an array of individually replaceable electric radiant heating elements disposed inside protective temperature and pressure-resistant tubes and mounted in the vapor space substantially above the means for moving the carbonaceous matter through the thermolysis reactor and the means for moving the char through the pressurized activation reactor.

5. The system as described in claim 1 wherein the steam distribution system of the thermolysis reactor is an array of apertures disposed along the bottom thereof, but separately within the individually thermally controlled zones for sequentially drying, torrefying, pyrolysing, and devolatilizing the carbonaceous matter, and the steam distribution system of the pressurized activation reactor is through an array of apertures disposed along the bottom thereof.

6. The thermolysis reactor as described in claim 1 wherein the torrefaction zone is operated at 375 to 600° F., the pyrolysis zone is operated at 750 to 1050° F., and the devolatilization zone is operated at 1300 to 1350° F.

7. The thermolysis reactor as described in claim 1 wherein the drying and torrefaction zones, the torrefaction and pyrolysis zones, the pyrolysis and devolatilization zones, and the drying, torrefaction, and pyrolysis zones, are variously combined into single zones.

8. The pressurized activation reactor as described in claim 1 wherein the working pressure is in the range of 150 to 1,000 pounds per square inch gauge.

9. The system as described in claim 1 wherein the thermolysis reactor is operated at working pressures either the same as or differing from the working pressure in the pressurized activation reactor.

10. The system as described in claim 1 wherein the thermolysis reactor and the pressurized activation reactor are conjoined as a single reactor operated at a single working pressure, having a carbonaceous matter inlet, means for moving carbonaceous matter and char through the single reactor, separation means at the junction of the thermolysis section and the activation section of the single reactor acting to effectively isolate the interior environment of the thermolysis section from the interior environment of the pressurized activation section while allowing passage of the char from the thermolysis section into the pressurized activation section, and an activated carbon outlet.

11. The system as described in claim 1 comprising only the thermolysis reactor processing carbonaceous matter into char, the power island fueled by the volatile materials discharged from the thermolysis reactor, the means for delivering electric power from the power island to the radiant electric heat distribution system in the devolatilization zone, and the means for delivering steam from the power island to the zones for sequentially drying, torrefying, pyrolysing, and devolatilizing the carbonaceous matter.

12. The system as described in claim 1 comprising only the pressurized activation reactor processing char into activated carbon, the means for recovering heat from the pressurized synthesis gas, the hydrogen purification system, the means for compression and storage of the purified hydrogen, the power island fueled by the combustible tail gas, the means for delivering electric power from the power island to the radiant electric heat distribution system, and the means for delivering steam from the means for recovering heat from the pressurized synthesis gas to the pressurized activation reactor.

13. The system as described in claim 1 wherein the pressurized synthesis gas is enriched in hydrogen in a shift conversion reactor.

14. The system as described in claim 1 wherein the hydrogen purification system is a pressurized swing adsorber.

15. The system as described in claim 1 wherein means are provided to recover selected chemicals by controlled condensation of a portion of the volatile materials discharged from the thermolysis reactor.

16. The system as described in claim 1 wherein a portion of the char produced in the thermolysis reactor is diverted and the remainder enters the char inlet of the pressurized activation reactor.

17. The pressurized activation reactor as described in claim 8 wherein the working pressure is in the range of 300 to 600 pounds per square inch gauge.

\* \* \* \* \*

UNITED STATES PATENT AND TRADEMARK OFFICE
CERTIFICATE OF CORRECTION

PATENT NO. : 11,834,338 B1
APPLICATION NO. : 17/664753
DATED : December 5, 2023
INVENTOR(S) : John W. Black and Russel M. Adams It is certified that error appears in the above-identified patent and that said Letters Patent is hereby corrected as shown below:

On the Title Page

Delete the title page and substitute therefore with the attached title page consisting of the corrected illustrative figure.

In the Drawings

Please replace Fig. 1 with Fig. 1 as shown on the attached page.

In the Specification

Column 2, Line 54, "As is illustrated in Chart 1, biomass" should be --Biomass--.

Signed and Sealed this
Ninth Day of April, 2024

Katherine Kelly Vidal
*Director of the United States Patent and Trademark Office*

(12) United States Patent
Black et al.

(10) Patent No.: US 11,834,338 B1
(45) Date of Patent: Dec. 5, 2023

(54) CONTINUOUS CARBONACEOUS MATTER THERMOLYSIS AND PRESSURIZED CHAR ACTIVATION WITH HYDROGEN PRODUCTION

(71) Applicants: John W. Black, Markham (CA); Russel M. Adams, Penryn, CA (US)

(72) Inventors: John W. Black, Markham (CA); Russel M. Adams, Penryn, CA (US)

( * ) Notice: Subject to any disclaimer, the term of this patent is extended or adjusted under 35 U.S.C. 154(b) by 0 days.

(21) Appl. No.: 17/664,753

(22) Filed: May 24, 2022

(51) Int. Cl.
C01B 32/39 (2017.01)
C01B 32/378 (2017.01)

(52) U.S. Cl.
CPC .......... *C01B 32/39* (2017.08); *C01B 32/378* (2017.08); *C01B 2210/0014* (2013.01); *C01B 2210/0051* (2013.01)

(58) Field of Classification Search
CPC ...... C01B 32/378; C01B 32/336; C01B 32/39
See application file for complete search history.

(56) References Cited

U.S. PATENT DOCUMENTS

| | | | |
|---|---|---|---|
| 5,096,463 A | 3/1992 | Beierle | |
| 5,173,921 A | 12/1992 | Gaylord | |
| 5,955,039 A | 9/1999 | Dowdy | |
| 6,061,384 A | 5/2000 | Koslow | |
| 7,771,668 B2 | 8/2010 | Ohashi | |
| 7,981,835 B2 | 7/2011 | Srinivasachar | |
| 8,192,647 B2 * | 6/2012 | Chornet | C10J 3/463 252/373 |
| 8,715,582 B1 | 5/2014 | Decker | |
| 8,999,885 B2 | 4/2015 | Majmudar | |
| 9,446,975 B2 | 9/2016 | Nickerson | |
| 9,624,109 B2 | 4/2017 | Srinivasachar | |
| 9,746,242 B2 | 8/2017 | Giebelhausen | |
| 2006/0130401 A1 | 6/2006 | Giglio | |
| 2012/0110135 A1 | 5/2012 | Gong | |
| 2020/0385273 A1 | 12/2020 | Donnigan | |

FOREIGN PATENT DOCUMENTS

GB WO 2020/148551 A2 * 1/2020

OTHER PUBLICATIONS

Nikolaidis, P.; Poulakis A. "A Comparative Overview of Hydrogen Production Processes." Renewable and Sustainable Energy Reviews 67 (2017), 597-611. Elsevier, Amsterdam, NL.
Menendez-Diaz, J. A.; Martin-Gullon, I. "Types of Carbon Adsorbents and Their Production." In Activated Carbon Surfaces in Environmental Remediation (Interface Science and Technology Series, 7), T. Bandosz, Ed., 2006, 1-48. Elsevier, Amsterdam, NL.

* cited by examiner

Primary Examiner — Yong L Chu
(74) Attorney, Agent, or Firm — Squire Patton Boggs (US) LLP (57) ABSTRACT

Continuous thermolysis of carbonaceous matter in a controlled temperature and steam environment to produce a low volatility char, with subsequent steam activation of the char under pressure producing activated carbon and pressurized syn-gas, all of which are carried out in a reactor system including one or more vessels. The syn-gas is enriched in hydrogen in a high temperature shift reactor and separated in a pressurized swing adsorber to provide a pressurized pure hydrogen stream and a low-pressure combustible tail gas. The tail gas and the volatiles from the thermolysis step are combusted to provide process steam and electric power. The electric power is used to supplement the thermal requirements of the process with the balance being exported.

17 Claims, 4 Drawing Sheets

FIG. 1